J. Johnson,

Globe Valve,

Nº 49,414. Patented Aug. 15, 1865.

Witnesses:
Wm Geo Harold
Chas H. Smith

Inventor:
John Johnson

UNITED STATES PATENT OFFICE.

JOHN JOHNSON, OF NEW YORK, N. Y.

IMPROVEMENT IN STEAM-VALVES.

Specification forming part of Letters Patent No. 49,414, dated August 15, 1865.

*To all whom it may concern:*

Be it known that I, JOHN JOHNSON, of the city and State of New York, have invented, made, and applied to use a certain new and useful Improvement in Steam-Cocks; and I do hereby declare the following to be a full, clear, and exact description of the said invention, reference being had to the annexed drawings, making part of this specification, wherein—

Figure 1:
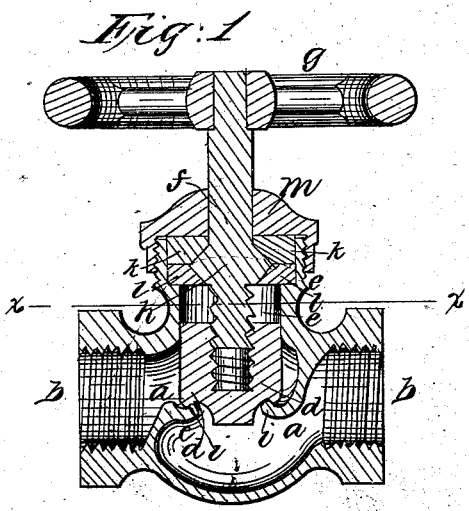
Figure 2:
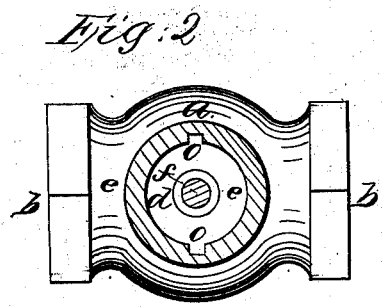

Figure 1 is a vertical longitudinal section of the said cock, and Fig. 2 is a sectional plan at the line $x\ x$.

Similar letters denote the same parts.

Steam-cocks have heretofore been made with a valve on the end of a screw-rod fitting a seat in a central diaphragm. Said valves have, however, in most instances, been rotated as they were forced toward the seat. This requires the exertion of considerable power, particularly with large valves, to turn them until they sit tightly upon the seat, and any inaccuracy of workmanship increases this difficulty.

The nature of my said invention consists in a metallic valve taking a rib-seat, and guided so as to rise and be pressed down by the action of a screw, said screw being on a rod passing through ground-disks that take against a collar on the said rod, thereby making the parts steam-tight without the use of any leather or other washers. My valve is not subject to injury by the steam-heat, as valves of this character usually are, because metallic parts only are employed, and the valve itself has no turning motion on its seat.

In the drawings, $a$ is the body of the cock, with coupling-screws at $b\ b$ or the steam-pipes, and a diaphragm, $c$, in which is the opening, as usual. Around this opening is a rib, $i$, forming the valve-seat, which seat, being raised, is less likely to retain any grit or foreign substance than the usual conical seat.

$d$ is the valve occupying the cylindrical portion $e$ of the valve-body, and guided therein by feathers $o\ o$, (see Fig. 2,) taking corresponding grooves on the inside of the cylinder $e$.

$f$ is a rod, at the upper end of which is a handle or wheel, $g$, and at the lower end is a screw-thread taking a corresponding thread on the inside of the valve $d$.

$h$ is a conical collar around said valve-rod $f$, occupying recesses in the plates $k$ and $l$, which plates are formed as perforated disks, ground into place in the cylinder $e$ and against the collar $h$, so as to be steam-tight when pressed together against the said collar $h$ by the cap $m$ that screws on around the outside end of the cylinder $e$.

My improved steam-cock is durable, unaffected by the heat, and steam-tight, whether open or closed, and that regardless of the direction in which the steam enters or leaves the cock.

What I claim, and desire to secure by Letters Patent, is—

The valve $d$, guided in the cylinder $e$, and taking a rib-formed seat upon the diaphragm, in combination with the screw-rod $f$, collar $h$, and disks $k$ and $l$, for the purposes and as specified.

In witness whereof I have hereunto set my signature this 15th day of May, 1865.

JOHN JOHNSON.

Witnesses:
 THOS. GEO. HAROLD,
 CHAS. H. SMITH.